(12) United States Patent
Krywyj

(10) Patent No.: US 9,127,803 B2
(45) Date of Patent: Sep. 8, 2015

(54) PIPE INSPECTION AND SERVICING

(75) Inventor: Daniel Krywyj, Derby (GB)

(73) Assignee: JD7 LIMITED, Derby, Derbyshire (GB)

( * ) Notice: Subject to any disclaimer, the term of this patent is extended or adjusted under 35 U.S.C. 154(b) by 437 days.

(21) Appl. No.: 13/529,940

(22) Filed: Jun. 21, 2012

(65) Prior Publication Data
US 2013/0019684 A1 Jan. 24, 2013

Related U.S. Application Data

(60) Provisional application No. 61/501,685, filed on Jun. 27, 2011.

(51) Int. Cl.
| | |
|---|---|
| F16L 55/40 | (2006.01) |
| F16L 55/30 | (2006.01) |
| F16L 55/46 | (2006.01) |
| F16L 101/30 | (2006.01) |
| G03B 37/00 | (2006.01) |
| F16L 55/28 | (2006.01) |
| G01M 3/00 | (2006.01) |
| G01M 3/24 | (2006.01) |
| G01M 3/38 | (2006.01) |

(52) U.S. Cl.
CPC ............... *F16L 55/40* (2013.01); *F16L 55/28* (2013.01); *F16L 55/30* (2013.01); *F16L 55/46* (2013.01); *G01M 3/005* (2013.01); *G01M 3/246* (2013.01); *G01M 3/38* (2013.01); *G03B 37/005* (2013.01); *F16L 2101/30* (2013.01)

(58) Field of Classification Search
CPC .......... F16L 55/28; F16L 55/30; F16L 55/40; F16L 55/46; F16L 2101/30; G01M 3/005; G01M 3/246; G01M 3/38; G03B 37/005
USPC ............................................. 73/865.8, 866.5
See application file for complete search history.

(56) References Cited

U.S. PATENT DOCUMENTS

| | | | | |
|---|---|---|---|---|
| 3,525,111 | A | * | 8/1970 | Von Arx .................... 15/104.061 |
| 3,543,144 | A | * | 11/1970 | Walters et al. ......................... 3/5 |
| 3,827,068 | A | * | 7/1974 | Hill et al. ............................ 37/5 |
| 4,244,296 | A | * | 1/1981 | Vertut ................................. 55/28 |
| 4,795,606 | A | * | 1/1989 | Fenemore et al. ............. 376/248 |

(Continued)

FOREIGN PATENT DOCUMENTS

| | | | | |
|---|---|---|---|---|
| DE | 3803274 A1 | * | 8/1989 | ............. G01M 3/38 |
| DE | 10251823 A1 | * | 5/2004 | ............. G01M 3/38 |

(Continued)

OTHER PUBLICATIONS

Search report for GB1211210.8, 2 pages, date of search Sep. 28, 2012, published as part of GB 2492460 A on Jan. 2, 2013.*

*Primary Examiner* — Thomas P Noland
(74) *Attorney, Agent, or Firm* — Blakely Sokoloff Taylor & Zafman

(57) ABSTRACT

A pipe inspection system comprises an inspection head at the end of a flexible shaft, wherein the inspection head comprises a rigid distal end portion and a rigid intermediate portion spaced from the distal end portion by a flexible region. The flexible region comprises a series of sections with pivotal connections between adjacent sections which allow pivoting about two orthogonal axes, wherein the range of pivoting between adjacent sections is limited such that the complete series can be pivoted by a maximum angle of between 80 and 100 degrees.

14 Claims, 8 Drawing Sheets

(56) References Cited

U.S. PATENT DOCUMENTS

| | | | | |
|---|---|---|---|---|
| 4,910,877 | A | * | 3/1990 | Sokol ............................. 33/544 |
| 5,527,169 | A | * | 6/1996 | Goldenberg et al. ............ 55/28 |
| 5,992,246 | A | * | 11/1999 | Nice ........................... 73/865.8 |
| 6,035,786 | A | * | 3/2000 | McKay et al. .................... 55/28 |
| 7,137,465 | B1 | * | 11/2006 | Kerrebrock et al. ............ 180/22 |
| 7,493,817 | B2 | * | 2/2009 | Germata .................. 73/865.8 X |
| 7,614,109 | B2 | * | 11/2009 | Filippovitch ..................... 55/40 |
| 2001/0003223 | A1 | * | 6/2001 | Couchman et al. ............... 55/28 |

FOREIGN PATENT DOCUMENTS

| | | | | |
|---|---|---|---|---|
| DE | 102008059183 | * | 6/2010 | .............. F16L 55/30 |
| JP | 10010659 A | * | 1/1998 | .............. G03B 37/00 |
| JP | 2003005094 A | * | 1/2003 | .............. G02B 23/24 |
| JP | 2005215401 A | * | 8/2005 | .............. G02B 23/24 |
| WO | WO 2010100480 A2 | * | 9/2010 | ............ G01M 3/005 |

* cited by examiner

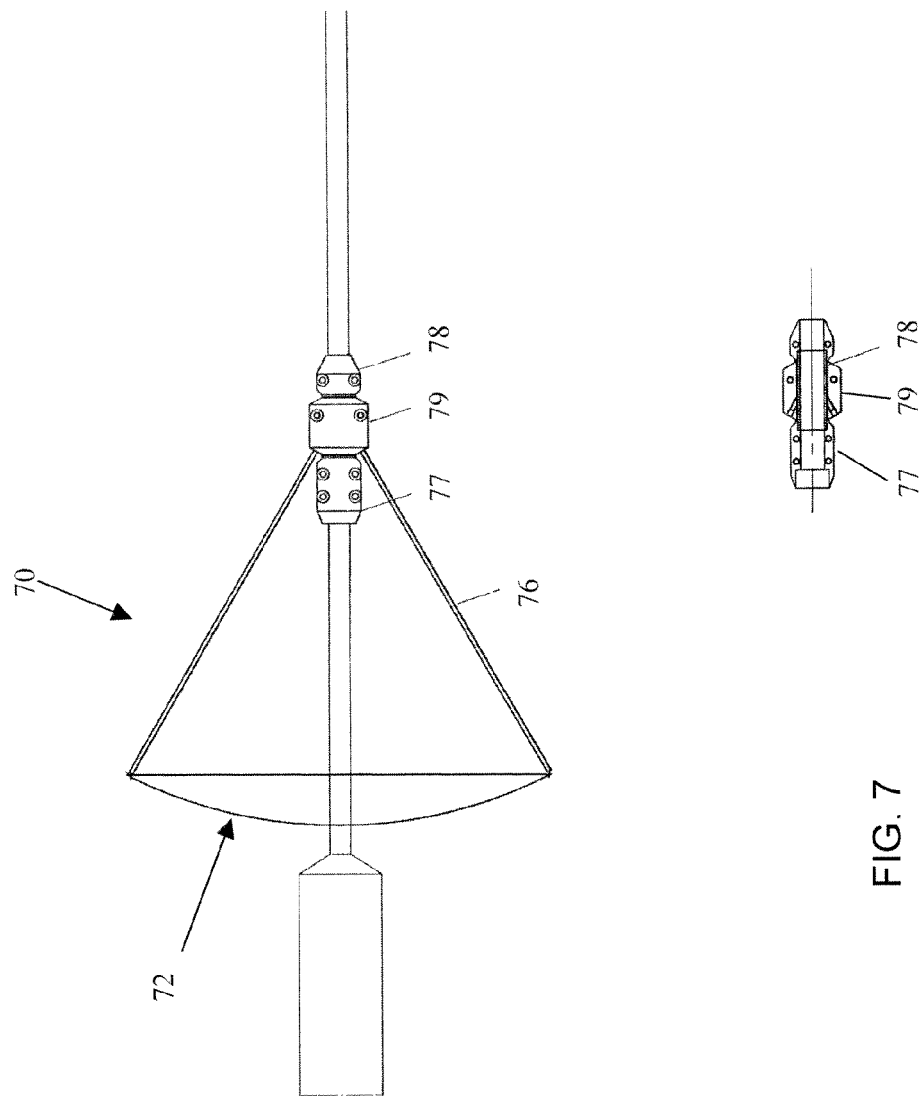
FIG. 7
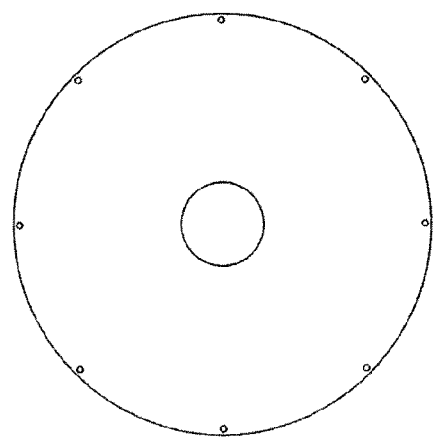

PIPE INSPECTION AND SERVICING

This is a non-provisional application claiming the benefit of U.S. Provisional Application No. 61/501,685, filed Jun. 27, 2011.

FIELD OF THE INVENTION

This invention relates to the inspection and/or servicing of fluid carrying pipes, such as mains water systems.

BACKGROUND OF THE INVENTION

Within the water industry, there is an increasing demand for routine repair works and maintenance/inspection works to be carried out without disruption of the water network services. Thus, there is a desire to maintain operational pressures and flows. In addition, it is desirable to minimise the amount of excavation required to find the location of leaks in underground pipes.

It is known therefore to introduce a camera into a pipe for detecting leaks by means of visual internal inspection. However, many difficulties arise in the feeding of a camera over a long distance. Furthermore, visual inspection is not fully reliable in detecting leaks.

SUMMARY OF THE INVENTION

According to a first aspect of the invention, there is provided a pipe inspection system, comprising an inspection head at the end of a flexible shaft, wherein the inspection head comprises a rigid distal end portion and a rigid intermediate portion spaced from the distal end portion by a flexible region, wherein the flexible region comprises a series of sections with pivotal connections between adjacent sections which allow pivoting about two orthogonal axes, wherein the range of pivoting between adjacent sections is limited such that the complete series can be pivoted by a maximum angle of between 80 and 100 degrees.

This arrangement defines a mechanical linkage which can form tight bends to ease insertion of the pipe inspection head along a pipe. The linkage can be passive so that it follows the contours of the pipe along which the system is being fed.

Preferably, a central hollow tube runs along the inside of the sections. This can carry signal cables to the inspection head. However, it can also function as a biasing arrangement, to urge the shaft back towards a straight configuration. It can also have some plasticity, so that a pre-bend can be held by the tube, which tends to bias the head to deflect in a certain direction. Thus, a pre-bend can be applied, and this helps the inspection head to be steered around a first (known) obstacle when it is inserted into the pipe.

According to a section aspect of the invention, there is provided a flexible guide for guiding insertion of a pipe inspection system into a pipe, the flexible guide comprising a series of sections with a pivotal connection between adjacent sections which allows pivoting about an axis, wherein the range of pivoting between adjacent sections is limited such that the complete series can be pivoted by a maximum angle of between 80 and 100 degrees, wherein the inner surface of each section is provided with a roller arrangement for guiding a pipe inspection system shaft which passes though the centre of the sections.

This arrangement provides a low friction bend through which the pipe inspection system shaft can be fed. By reducing the friction of bends in the shaft, the range to which the inspection head can be inserted is increased.

A first design of the flexible guide has a stop, which is arranged such that when the stop reaches a surface, the flexible guide has been bent by 90 degrees to define a bend from a direction normal to the surface to a direction parallel to the surface. This can be used to form a 90 degree bend simply by urging the guide against a surface. For example, it can be urged against the base of a fire hydrant column to form a bend from the column direction to a direction along which a connection pipe runs.

The bend is formed passively. For example, the pivotal connections can comprise (non-driven) hinges which connect the sections together. The bending is in one direction only, but the direction can be chosen by suitable choice of the angular orientation. The sections can be annular circular members.

In a second design, the sections are coupled together by cables which run along the sections at different circumferential positions, wherein the cables are fixed to an end of the guide, such that tensioning one cable forms a bend in the guide.

This provides an actively driven arrangement which can be steered by suitable driving of the cables. Four cables can be provided. The cables can pass through holes in connecting balls, and the surfaces of the balls define pivoting surfaces. The cables then form the connections between sections as well as enabling active driving of the bending function. The surfaces of the balls provide smooth pivoting regions between the sections.

The cables are preferably positioned towards the outer radius of the sections, and the roller arrangement is provided nearer the centre. The roller arrangement guides the shaft of the inspection system, which passes along the centre. The sections can be annular circular members.

According to a third aspect of the invention, there is provided a pipe inspection system, comprising an inspection head at the end of a flexible shaft, wherein a drive mechanism is provided spaced from the end portion, wherein the drive mechanism comprises a rotary bearing mounted on the shaft, and an expandable web which is attached to the rotary bearing by support rods which are pivotally connected to the rotary bearing such that they can contract to collapse the web around the shaft or expand to form an open web which functions as a drive mechanism driven by the fluid flow in the pipe.

This provides a web (like a parachute) for urging the inspection head along the pipe. It can be collapsed when the inspection head is inserted into the pipe, for example by a fixing which can be remotely removed. For example a Velcro tab can hold the tab against the shaft during initial insertion into the pipe. The rotary bearing prevents the inspection system shaft becoming twisted.

The support rods can comprise spring steel.

The invention also provides a pipe inspection system, comprising:

an inspection head at the end of a flexible shaft; and a flexible guide for guiding insertion of the inspection head into a pipe, the flexible guide comprising the passive guide of the invention and defining a first bend after the point of insertion of the inspection head into the pipe.

The system can further comprise the actively shaped guide of the invention and defining a second bend after the point of insertion of the inspection head into the pipe.

The system of the invention can be installed through a fire hydrant.

BRIEF DESCRIPTION OF THE DRAWINGS

Examples of the invention will now be described in detail with reference to the accompanying drawings, in which:

FIG. 7 shows an example of a flow driven drive mechanism for a pipe inspection system;

DETAILED DESCRIPTION

The invention relates to servicing and monitoring equipment for the interior of pipes.

Before describing the system of the invention, it will first be explained how this type of system can (in known manner) be launched into a pipe of a water mains system using a launch chamber, such that operational pressures and flows within the water system can be maintained.

Figure 1:
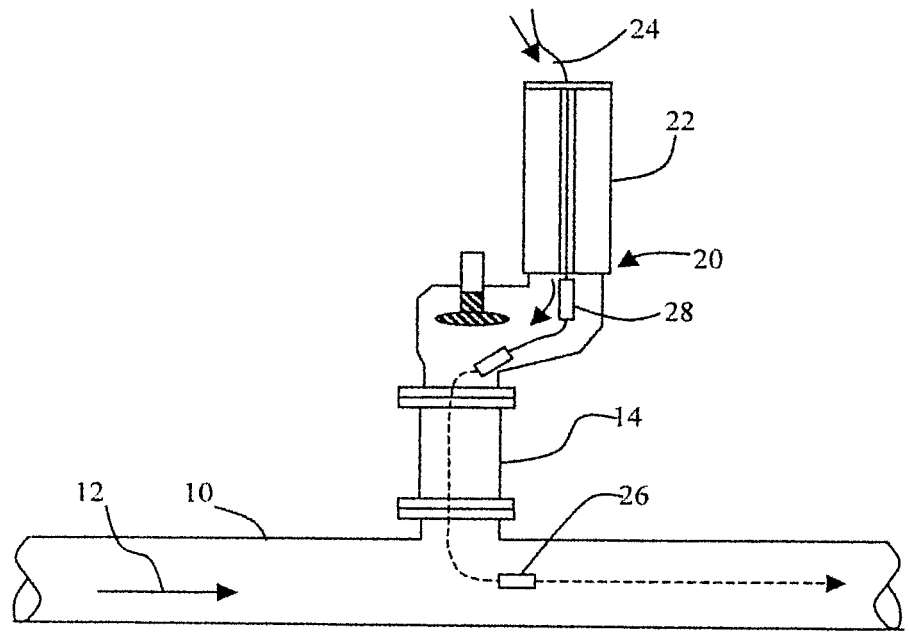
FIG. 1 shows a known way for an inspection/repair system to be introduced into a pipe.

FIG. 1 shows the basic layout. A mains water pipe 10 carries a pressurised water flow 12. At a point along the pipe 10, there is an existing fire hydrant, which comprises a riser section 14 and a valve section 16. The valve section 16 has a control handle 18 which controls the flow of water from the mains pipe to an outlet 20 of the fire hydrant.

A launch chamber 22 can be provided in the form of a cover used for launching equipment into the mains water flow and which is coupled to the outlet 20.

FIG. 1 shows a control rod 24 passing through the chamber 22, and used to push a device 26 into the mains pipe 10 from an initial launch position shown as 28.

Figure 2:
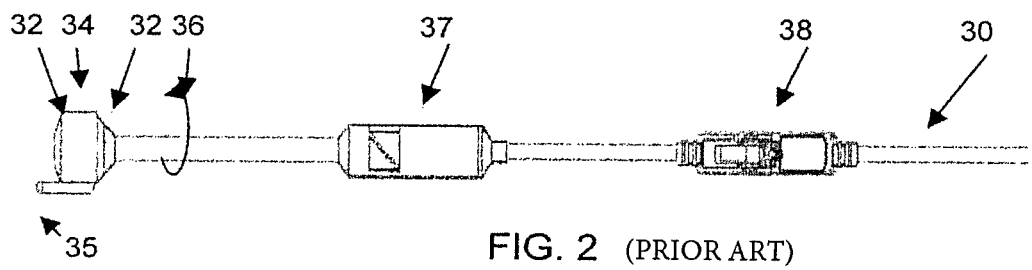
FIG. 2 shows an example of a known inspection/repair system.

The invention relates specifically to the equipment used to feed the device into the pipe and to aspects of the device 26 which assist this. FIG. 2 shows a known system in more detail.

The system comprises a feed cable 30, with an inspection head 32 at a remote end of the feed cable. The inspection head comprises a camera with a light ring for illuminating the path in front. It also includes a sonde (acoustic output probe) used to enable location of the head from above the ground, and a hydrophone for detecting sound within the interior of the pipe.

The head acts as a lead device at the remote end of the cable 30, and the other devices are positioned in series behind the inspection head.

The camera is used to relay real-time images, and the hydrophone is used to listen for frequency ranges identifying leaks within pipework when the head 32 passes such failures or defects.

The head 32 includes a guiding portion 34 which has a guide roller 35 (such as wheel, bearing or track) mounted at the remote end of the feed cable. The guide wheel has a rotation axis perpendicular to the length of the feed cable, i.e. it rolls as the feed cable moves along the pipe. The roller may comprise a series of rollers. However, the axis (or the axis of one of the rollers) is offset from the elongate feed cable axis, so that the head 32 rests on the wheel, with the roller 35 in contact with the pipe inner wall, and the camera in the centre of the pipe.

The feed cable 30 is rotatable about its elongate axis (see arrow 36), thereby to change the angular position of the guide wheel within the pipe.

This means the angular position of the wheel can be used to steer the head 32 as it advances in the pipe. By locating the guide wheel within the field of view of the camera (i.e. in front of the camera), the path of the pipe ahead can be visually inspected as well as the current angular orientation of the wheel. Adjustment to the angular orientation can then be made so that the head steers in the desired direction when the feed cable 30 is advanced further.

An ultrasound probe and an ultrasound sensor (together forming an ultrasound head 37) are provided along the feed cable 30. The ultrasound signals are processed and displayed on a display. The resulting ultrasound image provides a representation of the properties of the pipe wall. To do this, the ultrasound signal is scanned around the inner circumference to build up a full image.

FIG. 2 also shows a repair head 38 which enables release of repair materials to a desired location of the pipe.

The different components in FIG. 2 are typically spaced by around 15 cm, and the total length of the cable can be around 100 m. The cable has an outer diameter of approximately 12 mm (typically 10-25 mm) and maximum diameter of the components along the cable can be 22 mm.

The system described above is known from WO2010/100480.

Figure 9:
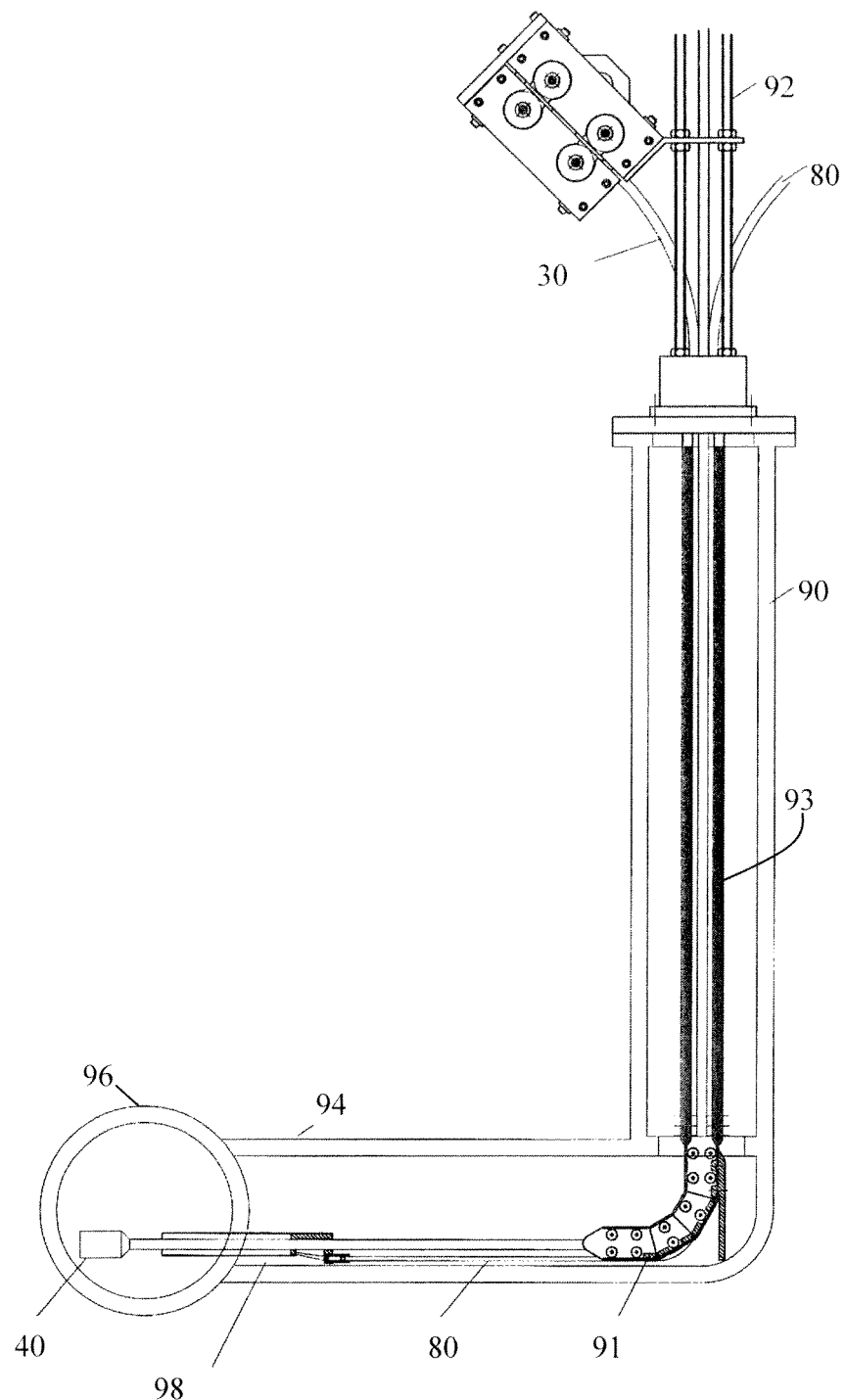
FIG. 9 is used to explain how the different aspects of the system of the invention can be used for a pipe inspection system inserted through a fire hydrant.

This invention concerns particularly the way the device is fed into and along the water pipe, and relates to various design aspects of the system. Furthermore, the invention facilitates the use of the system with pillar type fire hydrants, for example with a lateral connection pipe between the main water pipe and the vertical fire hydrant pillar (as shown in FIG. 9 described below).

Whilst water mains inspection and assessments are the primary function of the system, the system may also be utilised within the gas and oil pipe-works.

Figure 3:
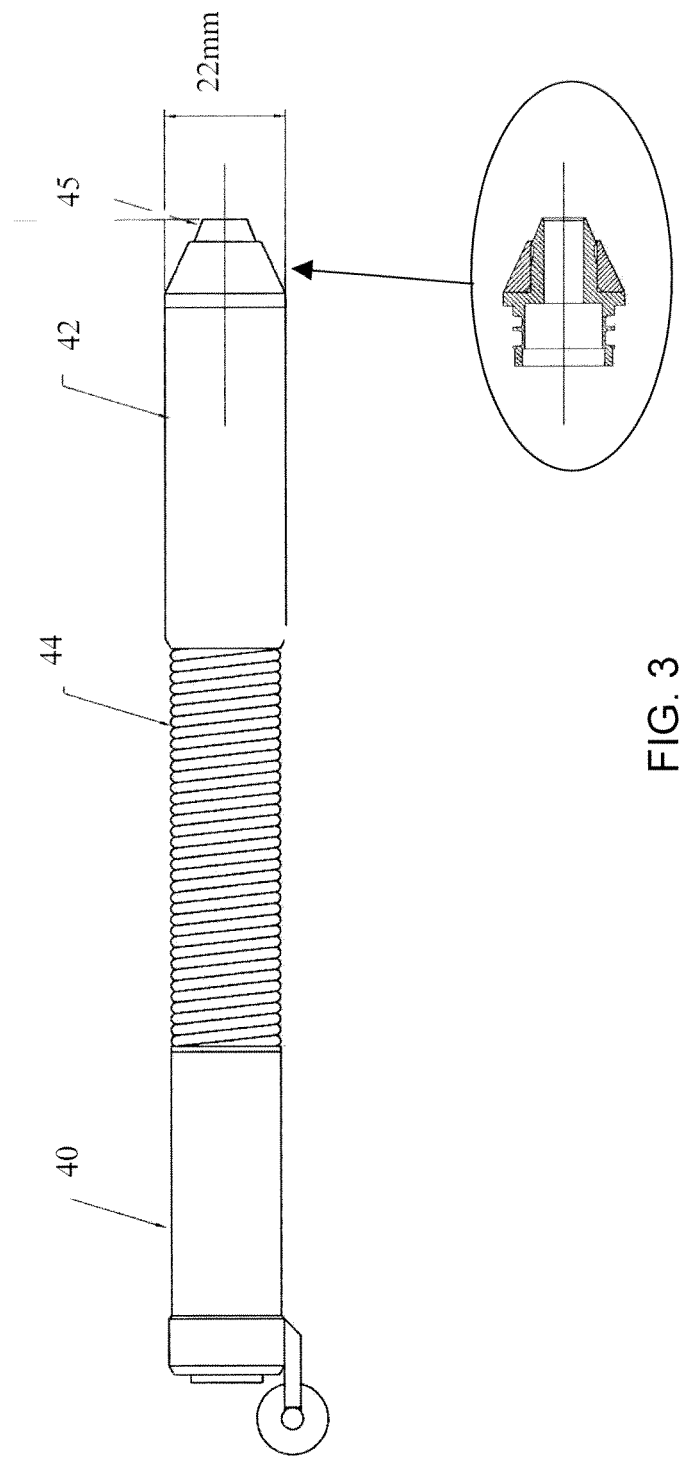
FIG. 3 shows a first example of a flexible head for a pipe inspection system.

FIG. 3 shows an example of sensor head design which makes the path around bends easier.

The sensor head leading end incorporates a colour camera system 40 with light ring and hydrophone. The sensor head rear 42 incorporates a sonde and cable connector 45 for connection to a control cable or other systems. The front 40 and rear 42 are connected via a flexi-joint or spring arrangement 44.

The system has a miniature size (for example length 200 mm-250 mm and integrates various technologies into one package. The camera system allows for real-time viewing whilst the hydrophone is used to listen for frequency ranges identifying leaks within pipe-work when the system passes such failures/defects. The geometry of the sensor heads including the spacing between the front and rear section and a pre-set offset angle of the flex-joint make this process possible through pillar style fire hydrants.

A pre-set offset angle is used to provide a bias so that the head tends to bend in one direction when pushed into a pipe. The direction of the pre-set bend can be matched to the direction of a bend in the pipe by twisting the head while viewing with the camera.

The rear part 42 has a connection 45 which incorporates a thread which allows engagement onto the main body and also includes an O ring seal acting as the pressure boundary as well as a grove for a location pin or dowel to prevent releasing when required.

The inside of the rear connector 45 is hollow in profile where a small 6 way electrical connector is housed. The geometry is such to allow all features within the same head over a maximum of 22 mm outside diameter.

In FIG. 3, the joint is shown as a spring.

Figure 4:
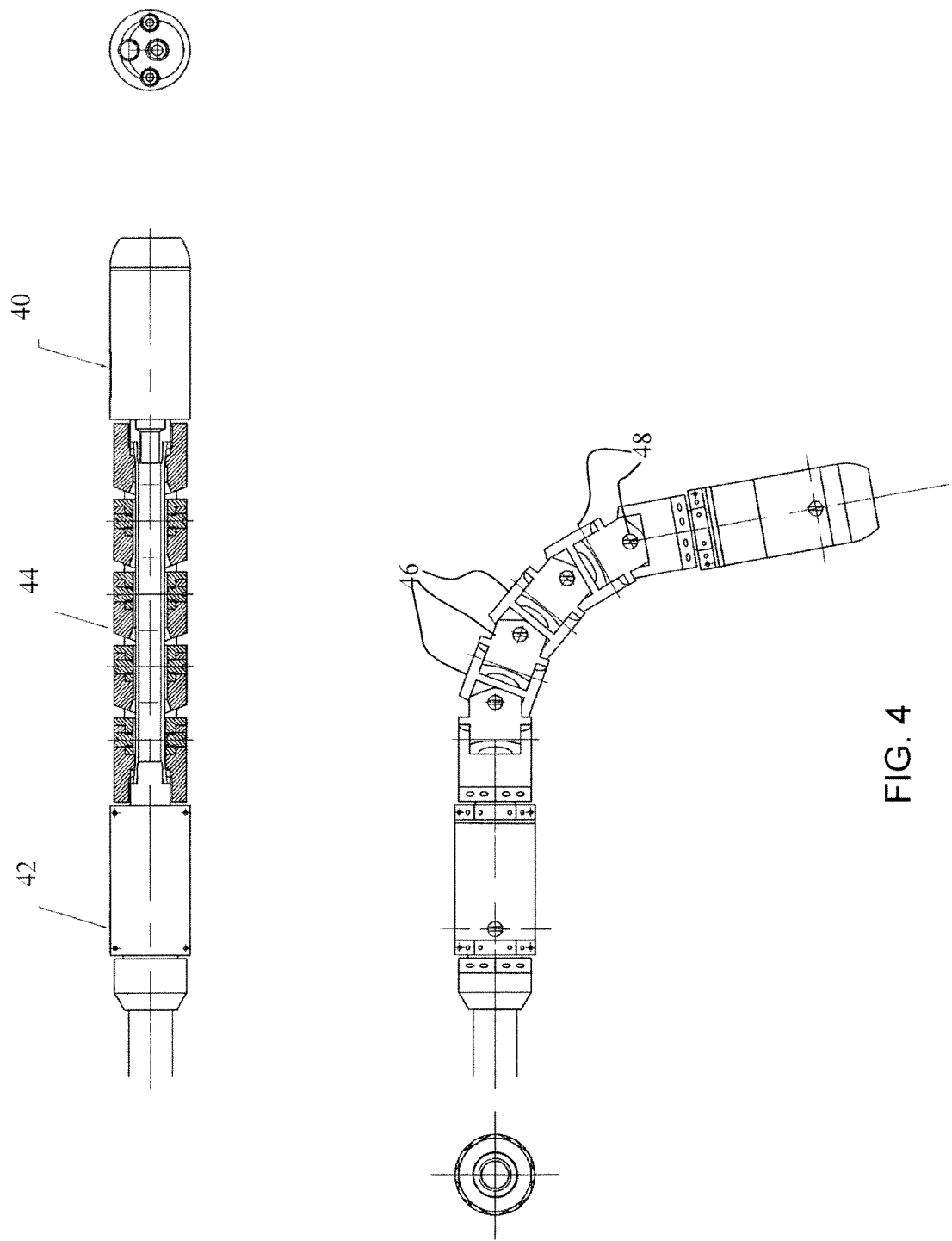
FIG. 4 shows a first example of a flexible head of the invention for a pipe inspection system.

A more complex mechanical joint is shown in FIG. 4. The top part shows the connector straight and the bottom part shows the bend.

The mechanical joint is in the form of an engineered assembly which can be used between the sensor head halves. The mechanical joint allows a pre-set bend radius to be held in form when an end loading is applied.

The joint comprises a series of sections 46, each section pivotally mounted to the next by two orthogonal axes 48 perpendicular to the length of the joint. In this way, each section is coupled to the next by an arrangement like a constant velocity (CV) joint which allows movement in all directions.

The amount one section can pivot relative to the next (in both pivot directions) is limited by skirts which abut when the joint is bent, so that the complete length of sections can bend by around 90 degrees. Thus, the profile of each link is such as to provide a mechanical stop at a pre-defined angle to ensure the joint will not bend beyond this angle. The joint may incorporate as many links as necessary.

A nylon tube runs along the centre. This urges the joint to return towards its straight position, but it can hold a pre-bend which biases the joint to bend in a certain direction. Thus, the internal tube through the assembly generally causes the assembly to return to its original position when end loading is released but allows a pre-bend to be applied.

The assembly makes it possible to force the sensor head or other such head around 90 degree bends such as at the bottom of a pillar style fire hydrant and the T-Piece from the fire hydrant to the actual water pipe (seen in FIG. 9). This provides a rugged system to be used instead of a spring between the end sections as in FIG. 3.

The mechanical joint is attached to the sensor front and rear bodies via screw threads and locking holes are positioned to allow locking pins or wire to be used. Each link 46 of the flexible joint is identical with the exception of the front and rear which contain a female thread for mating purposes.

Figure 5:
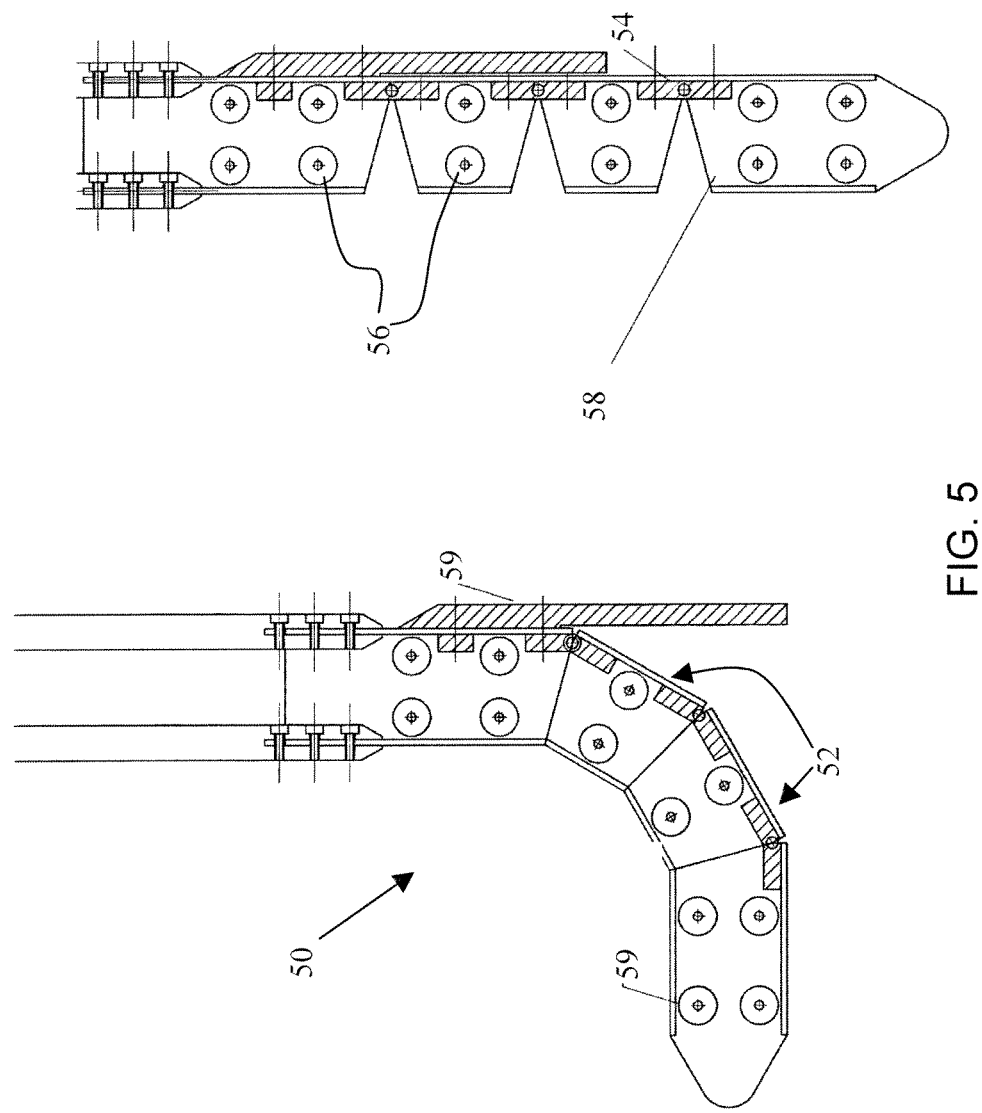
FIG. 5 shows a first example of a bendable guiding member for a pipe inspection system.

FIG. 5 shows an internal roller mechanism 50. This is used as a flexible guide for introducing the sensor probe into the fire hydrant (or other pipework). If the sensor cable has to pass multiple bends, reducing the friction at some of the bends will increase the distance that the cable can be inserted. The arrangement 50 of FIG. 5 is used to form a low friction 90 degree bend at the base of the fire hydrant shaft (as shown in FIG. 9).

The internal roller mechanism 50 is thus generally an assembly to assist with the installation of sensor heads into pipes and in particular its primary purpose is to create a safe path for the umbilical cable controlling the sensor head. This is critical for such installations into pipework. The assembly's key feature includes the ability to open out and pass through small access holes within the pipework. These are namely pressure tapings and/or fire hydrants, however the system may be applied to any orifice.

The roller mechanism will under load, hold a specific bend radius (typically 90 degrees) and lock into position until the loading it released.

The roller mechanism comprises a series of sections 52 which are hinged to each other by hinges 54. They hinge in one direction only so that a bend is only formed in one direction. The bend radius of the cable, which is passed internally through the mechanism, is also controlled by miniature rollers 56 on bearings to aid cable protection and reduce friction to a minimum. The roller mechanism is mounted over the cable from the free end opposite the sensor head (since the sensor head cannot pass through it).

The assembly includes formed angled plates 58 which are held together by joints and each plate houses a number of rollers. A rear stop plate 59 is mounted to the assembly which ensures the device opens to the 90 degree angle by acting as a depth stop. This minimises stresses through the formed plates if excessive vertical force is applied during installation. The depth stop is designed so that the when seated down, the sections form the desired curve. The sections do not need to be sprung or biased so that it is a passive rather than active component.

Figure 6:
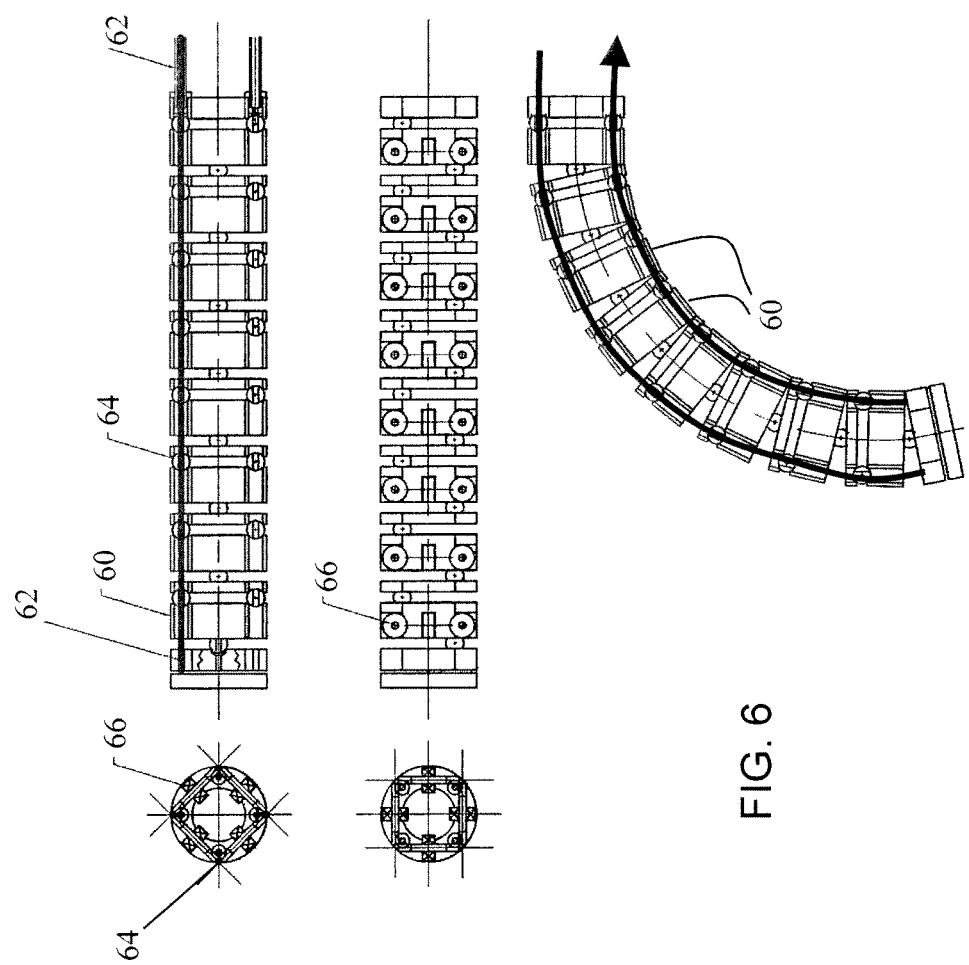
FIG. 6 shows a second example of a bendable guiding member for a pipe inspection system.

FIG. 6 shows a steerable (i.e. active) internal roller mechanism, again forming a flexible guide. The steerable internal roller mechanism is an assembly with a primary function to assist umbilical cables which support sensor heads, however it may be used to pass any cables through.

The top part shows the control arrangement, the middle part shows the mechanism in a straight configuration and the bottom part shows the bent configuration.

Whereas the passive arrangement of FIG. 5 is used as the first bend after the point of insertion, the arrangement of FIG. 6 can be used to navigate a bend further in the pipework. Again, the aim is to reduce the friction of the bend so that the reach of the sensor head is increased.

The assembly consists of several circular links 60. Four control wires 62 pass through the links. The control wires pass through balls 64 spaced at 90 degrees around the circumference of the sections. The control wires connect the sections together.

When loading is applied to the control wires, a controllable reaction is induced which allows the assembly to be controlled with regards to angles and positions. Each link also incorporates a number of miniature rollers which provides a clear, friction free path for a cable to pass internally. These rollers 66 define the internal passageway and provide a low friction bearing for the internal cable. This ensures cables can pass freely even when tight angles are formed. The rollers are mounted on four shafts in a direction tangential to the circular section.

Control of the assembly is for example by a worm and wheel gear box. This provides control in all directions and also allows the assembly to be locked into position.

The cables are anchored on both the front and rear of the assembly to ensure controllable bending may be induced. This particular assembly can for example allow 12 mm diameter cables to be passed through, however not restricted to this diameter. The control wire anchor point on the rear of the assembly is connected to an installation tube, however the control cable may serve as the installation rod if necessary. The maximum angle is controlled by the number of segments due to the clearance between each segment acting as a stop. This assembly may run fewer or more segments if required.

FIG. 7 shows an agitator drogue (parachute or sail, which will generally be termed a "web"). The agitator drogue 70 is an assembly which holds the sail parachute shape 72 into a flat (open) position allowing the fluid to drive the camera head along the length of the pipe.

The assembly comprises a main body 74 with angled holes where legs 76 in the form of rods are positioned. The legs provide the mounting points for the web 72. The orientation is such to allow passing into and out of an access hole on pipework (namely pressure tapings and/or fire hydrants). The assembly also incorporates a bearing to allow swivelling at all times to prevent twisting of the camera cable to be induced under flow conditions. Thus, the main body 74 has fixed ends 77,78 and a central bush part 79.

The assembly is fully splitable so it may be connected in situ. Typically the legs face forward, which ensures installation into small fittings and/or orifices is possible by controlling the release of the legs. Removal of the assembly is very simple due to the legs facing forward which allows it to be simply pulled from the fitting/orifice. Holding the sail/parachute into a preferred shape allows the minimum size or sail to be used for a given fluid flow rate. This is because the sail is held flat. Using legs in the form of rods as opposed to strings/wires/ropes prevent any tangling occurring. The agitator drogue assembly is configured to sit behind the camera head and clam onto the camera cable. This allows a full field of view throughout inspections of pipework.

Figure 8:
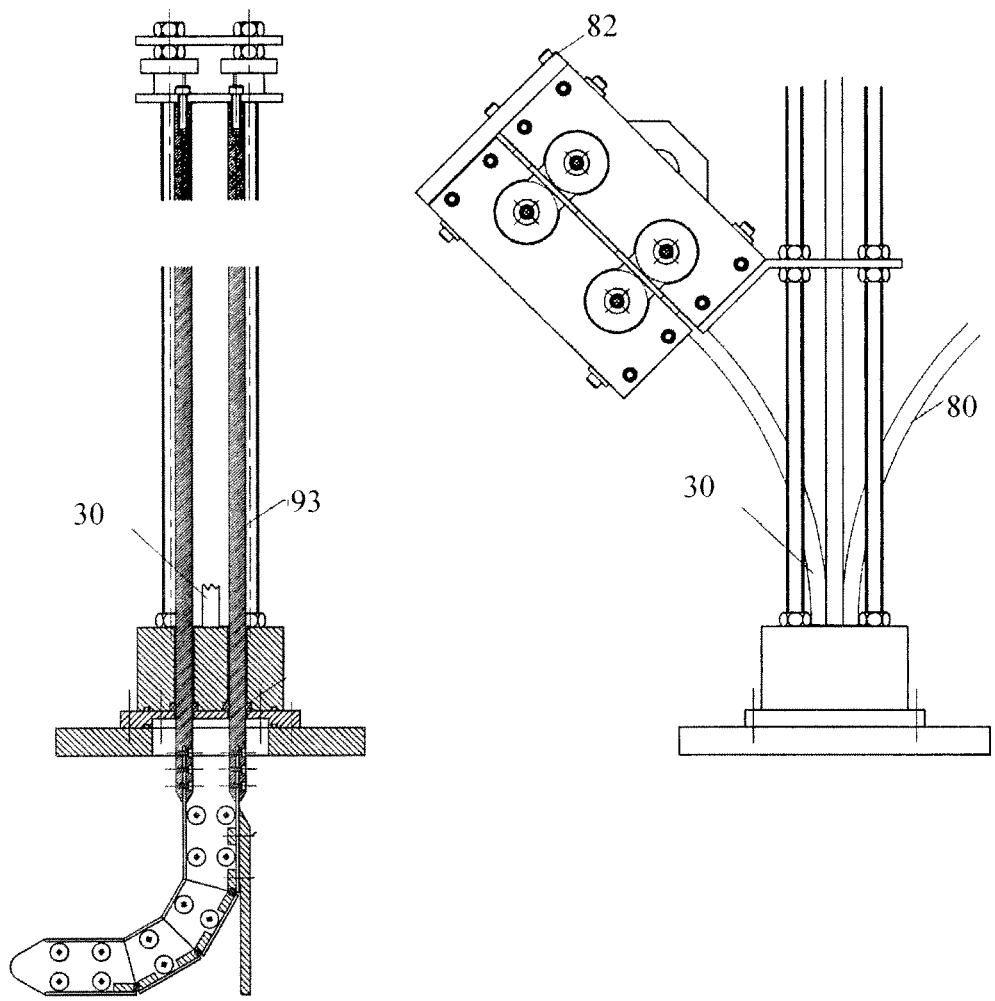
FIG. 8 is used to explain how the pipe inspection system is inserted into a pipe.

FIGS. 8 and 9 shows the pillar fire hydrant launch arrangement. This is an assembly for attaching onto pillar fire hydrants and providing a controlled mechanical means for passing sensor heads and/or umbilical's into water pipes. The assembly requires the bonnet (lid) to be removed from the fire hydrant where the assembly is mounted to the hydrant body. Once into position the fire hydrant may be pressurised by opening the fire hydrant isolation valve and the seals within the launch arrangement make this possible.

This arrangement incorporates two roller mechanisms, the forward one is of the design of FIG. 6 and is steerable using control cables 80 routed through pressure seals to the operator above ground. This allows the front assembly to be navigated around bends and obstacles. Once in position the second (rear most) rollers are deployed again through pressure seals. The second is of the type shown in FIG. 4. The rearmost roller arrangement is designed to prevent friction induced from passing an object around the lower section of the fire hydrant i.e. presenting a clear controlled path for an umbilical to pass.

A cable push pull system 82 is installed onto the launch arrangement (as illustrated) and the height varied using threaded bars protruding from the system mounting plate.

The push pull arrangement 82 can also control cable rotation and can be as described in WO2010/100480.

The camera cable 30 is passed through a secondary seal arrangement within a base plate which mounts over the fire hydrant column 90, preventing water leakage from the pressurised assembly. The lead rollers or steerable rollers are also passed through a seal adjacent to the camera cable seal allowing both to operate independently of each other.

The position of the secondary (rear) roller arrangement 91 (of the type shown in FIG. 5) is controlled vertically by nuts reacting onto threaded bars 92 protruding from the mounting plate. These control the positions of installation rods 93. Various adaptor plates may be installed onto the mounting plate to suite the hole patterns of all manufacturers of pillar style fire hydrants.

The roller arrangement 91 forms a bend to a connecting pipe 94, which is at 90 degrees to the main pipe 96. A primary (front) roller arrangement 98 (of the type shown in FIG. 6) forms the bend between the connecting pipe 94 and the main pipe 96 and is controlled by the cables 80.

The system has been described in connection with the inspection or repair of water pipes, and is for gathering information of water main structure and integrity in this example. However, the apparatus can also be used for gas and oil pipes, or other fluid channels.

The example above shows the system inserted at a hydrant. However, the apparatus may equally be inserted at pressure fittings Various modifications will be apparent to those skilled in the art.

I claim:

1. A pipe inspection system, comprising an inspection head at the end of a flexible shaft, wherein the inspection head comprises a rigid distal end portion and a rigid intermediate portion spaced from the distal end portion by a flexible region,
wherein the flexible region comprises a series of sections with pivotal connections between adjacent sections which allow pivoting about two orthogonal axes, wherein the range of pivoting between adjacent sections is limited such that the complete series can be pivoted by a maximum angle of between 80 and 100 degrees, wherein a drive mechanism is provided spaced from the distal end portion, wherein the drive mechanism comprises a rotary bearing mounted on the shaft, and an expandable web which is attached to the rotary bearing by support rods which are pivotally connected to the rotary bearing such that they can contract to collapse the web around the shaft or expand to form an open web which functions as a drive mechanism driven by the fluid flow in the pipe.

2. A system as claimed in claim 1, wherein a central hollow tube runs along the inside of the sections.

3. A system as claimed in claim 1, wherein the support rods comprise spring steel.

4. A system as claimed in claim 1, further comprising:
a flexible guide for guiding insertion of the inspection head into a pipe.

5. A, pipe inspection system,. comprising an inspection head at the end of a flexible shaft, wherein the inspection head comprises a rigid distal end portion and a rigid intermediate portion spaced from the distal end portion by a flexible region,
wherein the flexible region comprises a series of sections with pivotal connections between adjacent sections which allow pivoting about two orthogonal axes, wherein the range of pivoting between adjacent sections is limited such that the complete series can be pivoted by a maximum angle of between 80 and 100 degrees,
a flexible guide for guiding insertion of the inspection head into a pipe,
wherein the flexible guide comprises a series of sections with a pivotal connection between adjacent sections which allows pivoting about an axis, wherein the range of pivoting between adjacent sections is limited such that the complete series can be pivoted by a maximum angle of between 80 and 100 degrees, wherein the inner surface of each section is provided with a roller arrangement for guiding a pipe inspection system shaft which passes though the center of the sections.

6. A system as claimed in claim 5, comprising a stop, which is arranged such that when the stop reaches a surface, the flexible guide has been bent by 90 degrees to define a bend from a direction normal to the surface to a direction parallel to the surface.

7. A system as claimed in claim 6, wherein the flexible guide defines a first bend after a point of insertion of the inspection head into the pipe.

8. A system as claimed in claim 7, wherein the pivotal connections of the flexible guide comprise hinges which connect the sections together.

9. A system as claimed in claim 8, wherein the sections of the flexible guide are coupled together by cables which run along the sections at different circumferential positions, wherein the cables are fixed to an end of the guide, such that tensioning one cable forms a bend in the guide.

10. A system as claimed in claim 9, wherein the flexible guide defines a second bend after the point of insertion of the inspection head into the pipe.

11. A system as claimed in claim 10, wherein the first bend in the flexible guide is passively bent and the second bend in the flexible guide is actively bent in a desired direction by suitable control of the cables.

12. A system as claimed in claim 9, wherein four cables are provided.

13. A system as claimed in claim 9, wherein the cables pass through holes in connecting balls, wherein the surfaces of the balls define pivoting surfaces.

14. A system as claimed in claim 13, wherein the cables are positioned towards an outer radius of the sections, and the roller arrangement is provided nearer the center.

* * * * *

UNITED STATES PATENT AND TRADEMARK OFFICE
CERTIFICATE OF CORRECTION

| | | |
|---|---|---|
| PATENT NO. | : 9,127,803 B2 | Page 1 of 1 |
| APPLICATION NO. | : 13/529940 | |
| DATED | : September 8, 2015 | |
| INVENTOR(S) | : Daniel Krywyj | |

It is certified that error appears in the above-identified patent and that said Letters Patent is hereby corrected as shown below:

Claims

Column 8, Claim 5, line 28, delete "A, pipe inspection system,. comprising" and insert -- A pipe inspection system, comprising --

Signed and Sealed this
Fifteenth Day of March, 2016

Michelle K. Lee
*Director of the United States Patent and Trademark Office*